Nov. 1, 1927.

H. E. IVES 1,647,631

OPTICAL SYSTEM

Filed Aug. 20, 1925

Inventor:
Herbert E. Ives.
by E. W. Adams Att'y.

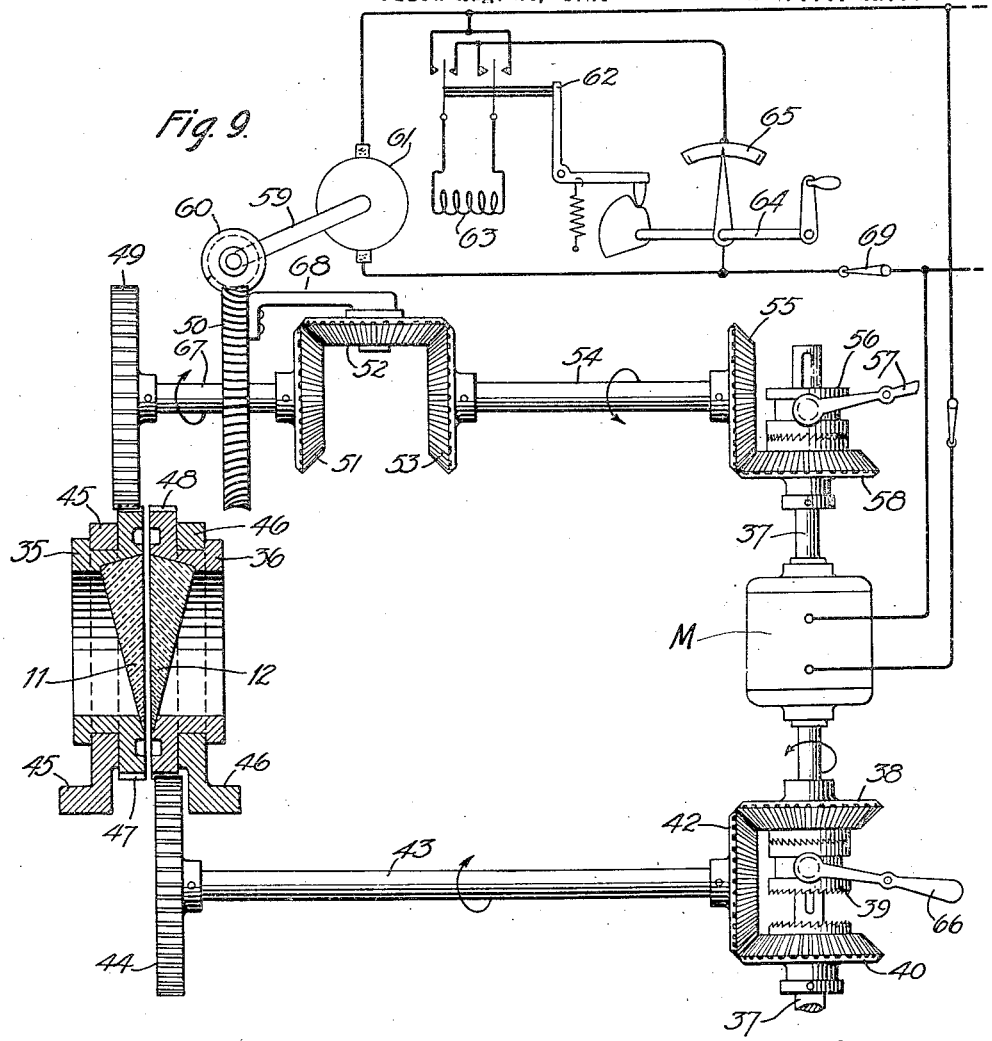

Patented Nov. 1, 1927.

1,647,631

UNITED STATES PATENT OFFICE.

HERBERT E. IVES, OF MONTCLAIR, NEW JERSEY, ASSIGNOR TO WESTERN ELECTRIC COMPANY, INCORPORATED, OF NEW YORK, N. Y., A CORPORATION OF NEW YORK.

OPTICAL SYSTEM.

Application filed August 20, 1925. Serial No. 51,307.

This invention relates to optical systems and more particularly to optical systems such as those employed in scanning objects and recording elements in picture transmission systems.

In transmitting photographs, writing or any pictorial subject by electrical means, it is usual to scan the object or picture by transmitting light from successive elemental areas of the subject to a photo-electric or other light sensitive cell at the transmitting station. Variations in the light falling on the light sensitive element cause current variations in a circuit including the element which are employed in transmitting signals to the receiving stations. At the receiving station these signals are employed in various ways to control the light from a source which is directed over a light sensitive surface in a path corresponding to the path in which the original subject at the transmitting station was scanned.

In an effort to increase the speed at which this operation can be carried out, many forms of movable and rotatable mirrors and prisms have been employed to direct the scanning or recording beam of light at the transmitting or receiving station or both, but in each case rapidity of motion has been obtained with a considerable sacrifice in the quality of the picture received. This is due to the fact that optical elements small enough to be very rapidly moved cannot usually direct a beam of light strong enough to faithfully reproduce the details in lights and shadows of the subject being scanned, when so rapidly moved.

The object of the invention is to provide means for easy and rapid scanning of an object and more particularly to improve the optical system used for scanning subjects and recording elements in picture transmission and reception.

In accordance with the present invention, this object is obtained by employing a variable angle prism or mirror which can transmit or reflect an intense beam of light and at the same time one which may be rotated at very high speeds, for rapidly moving the beam of light over the subject being scanned. This results not only in increasing the speed of picture transmission but enables pictures to be reproduced in minute detail.

Other objects and advantages of the invention will become apparent from the following description and drawings in which:

Fig. 9 illustrates one method of mounting and rotating the prisms.

Figs. 10 and 11 and 12 show two different patterns for scanning an object.

Figure 1:
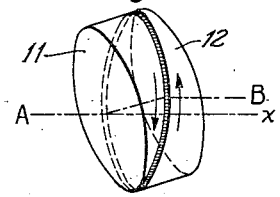
Fig. 1 is a perspective view of a variable angle prism as employed in accordance with one form of this invention and shown in the position in which the beam of light is least deviated.
Figure 2:
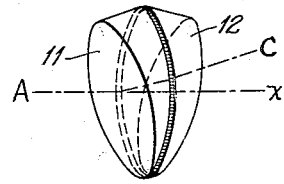
Fig. 2 illustrates this prism when the elements have each rotated 90° from their respective positions shown in Fig. 1.
Figure 3:
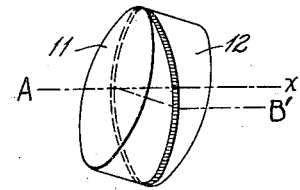
Fig. 3 illustrates the prisms when the elements have each rotated 180° from the position shown in Fig. 1.

In the form of the invention shown in Figs. 1, 2 and 3, two circular prism elements 11 and 12 of equal angle are adapted for rotation in opposite directions about a common axis A—X as indicated by the arrows. These prism elements are in the form of truncated cylinders, that is, the intersection of a cylinder and two non-parallel planes. In one position, as shown in Fig. 1, elements 11 and 12 are positioned so that the outer faces of the prism are parallel but inclined to the axis of rotation A—X. In this position an incident beam of light from light source A parallel to the axis of rotation is displaced to the position B near the axis but not bent to one side, that is, the emergent beam is still parallel to the axis of rotation. As the prism elements rotate in opposite directions, the outer faces move from the parallel position to form an angle between the faces which increases to a maximum when the elements have each rotated 90° from the position shown in Fig. 1. The prism then has the form shown in Fig. 2. This view is taken at right angles to the view of Fig. 1 in order to more clearly illustrate the form of the prism. During this rotation the angle between the faces has changed progressively from zero to a maximum. A beam of light traversing the prism will have moved from the center position as shown at the point B in Fig. 1 to a position at the maximum distance at one side as indicated at C in Fig. 2. Continued rotation of elements 11 and 12 causes the angle between the faces to decrease again in the same manner as it increased in the first 90° of rotation until they reach a position 180° from starting illustrated in Fig. 3. In this position the outer faces are again parallel but inclined in the opposite direction with respect to the axis of rotation from their inclination at starting as shown in Fig. 1. The beam of light has then moved from the extreme position C back to center at B' which is near the B center position but displaced by an amount depending upon the thickness of the prism. When each element has rotated 270° the outer faces of the prism are again in the maximum angle position opposite to their position at 90° as shown in Fig. 2 and a beam of light traversing the prism is deviated the maximum amount in the opposite direction. In rotating back to the starting point, the outer faces of the prism again become parallel as in Fig. 1 and the changes in the angle of the prism have passed through a complete cycle which will repeat again in the same order with each revolution of the elements.

It is thus seen that during each complete revolution of the elements, the angle between the outer faces of the prism progressively change from zero at the starting position to a maximum at 90°, back to zero at 180°, to a maximum in the opposite direction at 270°, and again back to zero at the starting position. It is therefore evident that the combination of two such elements forms a variable angle prism. The resultant movement of the beam of light traversing the prism is back and forth across the object, once in each direction for every complete revolution of the elements. There is no rotary motion of the beam of light so long as both elements are of the same angle and rotating at the same angular speed in opposite directions, as rotation of the beam of light by each element is counterbalanced by the equal and opposite rotation of the beam by the other element. With constant rotation of the elements, the beam of light will have simple harmonic motion back and forth across the subject.

Figure 4:
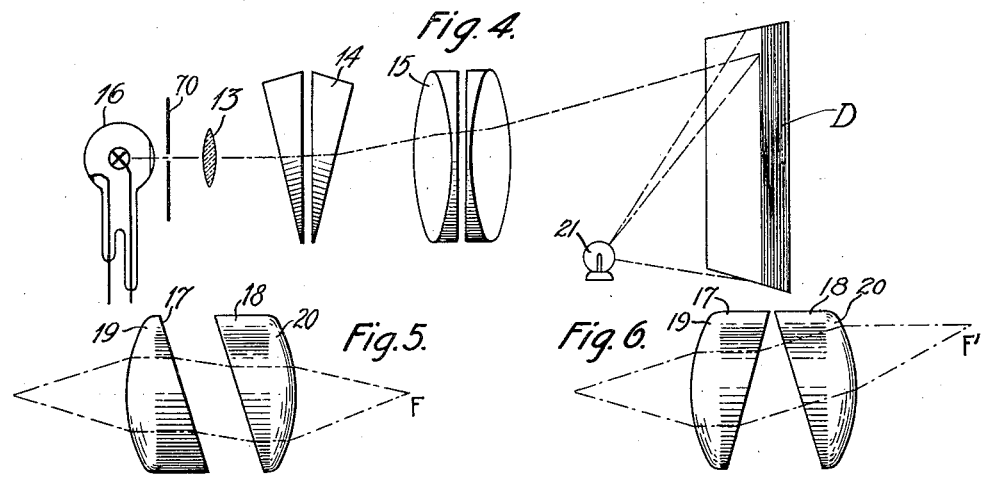
Fig. 4 illustrates a combination of variable angle prisms adapted for use with picture transmission apparatus.

For the purpose of scanning a picture or object, two such variable angle prisms 14 and 15 are employed as shown in Fig. 4, one rotating much more rapidly than the other. A strong beam of light from source 21 is focused by lens 13 upon a small aperture in screen 70 in front of the light sensitive cell 16 and rapidly moved up and down across the subject D by prism 15 while at the same time it is moved more slowly horizontally by prism 14. The movement of prism 14 is preferably intermittent, being rotated a step at a time as the beam of light reaches each extremity of its vertical movement, so that each path of scanning in turn will be displaced from each previous path by the width of a line. In this way, successive lines of scanning will be parallel covering the entire area uniformly. For best results, the beam of light should pass across the subject fifty or more times while the prism 14 is moving the beam one inch horizontally. The entire area is traversed in this manner in a series of lines very close together.

The prism elements are preferably made circular and of small diameter, about one inch being sufficient and, as shown in Fig. 9, may be mounted close together in rotatable mountings 35 and 36 capable of extremely high speed rotation. The mountings may be geared to a motor or turbine, M or the prisms may be mounted directly on the driving element itself or rotated in any other suitable manner. Prisms such as those described are of small diameter and light in weight and for that reason can attain great speed without danger of shattering due to the centrifugal force developed during rotation.

Figure 5:
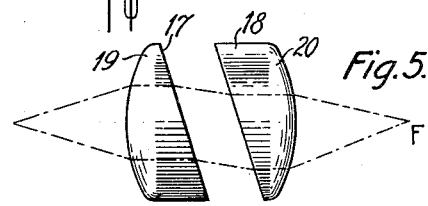
Figs. 5 and 6 show a modified form of variable angle prism in positions corresponding to Figs. 1 and 2 respectively.
Figure 6:
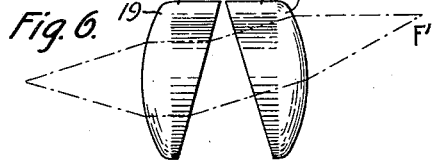

In the form of the device shown in Figs. 5 and 6, the exterior faces 19 and 20 of prism elements 17 and 18 are curved so as to form in effect a lens for focusing transmitted light. As shown in Fig. 5 when the prism elements are in the position corresponding to Fig. 1 a very strong beam of light traversing the prism may be focussed at the point F near the axis of rotation without the use of other optical means. Rotation of the elements to a position corresponding to Fig. 2 moves the point of focus to F' to a position the maximum distance from the axis as in the previous forms of the invention. Thus the movement of the beam can be made very rapid without sacrificing the intensity of the light transmitted. Either or both of the exterior faces of the prism may be curved to form a lens as specific uses demand.

Figure 7:
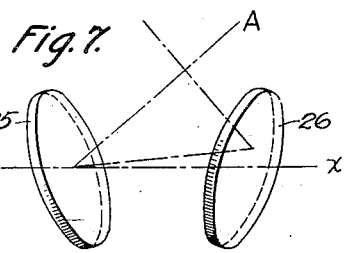
Fig. 7 illustrates the use of mirrors in the same manner as the prisms of the previous forms of the invention.

Fig. 7 illustrates mirrors operating in a manner similar to the prisms employed in the forms of the invention described above. In this case two mirrors 25 and 26 are mounted at equal angles to a common axis X—X and adapted for rotation in opposite directions. Incident light from the source A is rotated in one direction by reflection from the rotating mirror 25 and rotated in the opposite direction by reflection from rotating mirror 26. The resultant movement of the beam of light will be back and forth as in the case of the variable angle prisms, the rotation of the beam by each mirror being counteracted by the equal and opposite rotation of the beam by the other mirror. The operation and function of each element of the mirror combination is the same as that of the elements of the variable angle prisms described above. If desired, the mirrors may be formed concave in order to focus the light at a point.

The method by which the light sensitive element at the sending station controls the signals transmitted to the receiving station is immaterial as the invention is applicable to various types of picture transmission apparatus.

Figure 8:
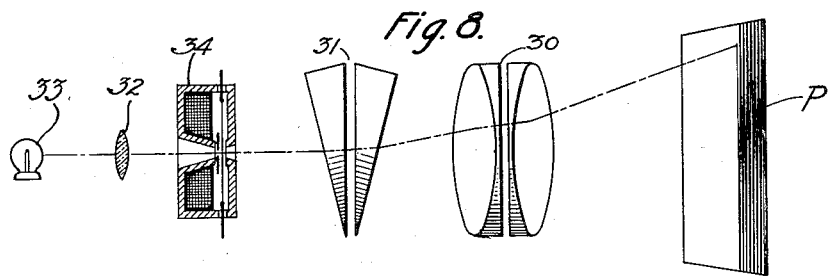
Fig. 8 illustrates an optical system embodying the invention as used in the receiving station of picture transmission systems.

For scanning a recording element at the receiving station shown in Fig. 8 light from source 33 passes through a light valve 34 and is focussed on a light sensitive film or other recording element D through variable angle prisms 30 and 31 or an optical system containing such prisms. These prisms are rotated in synchronism with those at the sending station so that the recording beam of light moves over the recording element in a path corresponding to the path of scanning at the sending station. Signals from the sending station vary the light passing through the light valve 34 so that as the beam of light moves progressively over the recording element it produces a record corresponding in the light and dark areas to those of the original subject. The prism 31 moves through 180° for each picture, that is, from one extreme position of the beam of light to the other while prism 30 may move the beam of light back and forth as many times as the detail of the picture require. This is usually fifty or more lines to the inch. Successive pictures can be very rapidly produced by governing the speed of rotation of the elements.

If it is desired to increase the detail of the picture, a smaller opening may be used in screen 70 at the sending station and the rate of rotation of prism 15 with respect to the prism 14 may be increased to form the lines 100 or more to the inch.

The speed of movement of the beam of light will not be as rapid at the extremities of the line as at the center, furthermore if the lens 14 does not have intermittent or step-by-step motion as described above the lines of scanning will overlap at both ends of each line. These facts tend to cause an uneven exposure of the recording surface which may be compensated for by any means such as a graded light screen or by any other suitable means.

In the foregoing description, it has been assumed that the prisms 11 and 12 or the mirrors 25 and 26 are rotated in opposite directions from each other at equal speeds in order to cause the beam of light to travel in a straight line path over the surfaces D and P. By varying the relative speeds of rotation of the prism elements and by changing their directions with respect to each other, the beam of light controlled by these prisms may be caused to trace different patterns while scanning the surface at the sending and receiving ends of the system. For example, if the elements are rotated in the opposite directions and at speeds which differ from each other considerably, a pattern of the type illustrated in Fig. 10 will be described. Since one prism element rotates very rapidly and the other relatively slowly, the trace resembles a flower of many petals. For a given amount of rotation of the more slowly rotating element, a complete symmetrical design is traced, as shown in Fig. 10. After a symmetrical figure has been completed, the trace continues to describe another similar figure, which, however, is slightly displaced from or, in other words, does not coincide with the first figure. The beginning of a second trace is illustrated in Fig. 10. Thus, after a sufficient number of these separate figures have been described, the total area will have been thoroughly scanned. Obviously, the speeds may be selected to accomplish desired changes in the charcter of the scanning pattern. Owing to the many overlapping intersections of the trace at the center of the pattern at the receiving station it may be desirable to introduce some suitable means for equalizing the intensity of light over the entire surface. This could be accomplished, for instance, by a screen of variable translucency.

If the prism elements 11 and 12 or the mirrors 25 and 26, as the case may be, are rotated in the same direction and at speeds which differ only slightly, a spiral trace is described on the surface of the object being scanned, such as shown in Figs. 11 and 12. As was explained hereinbefore, a single prism of the character shown when rotated will cause the beam of light to describe a circular path of constant radius. Similarly, the second prism if rotated alone, although at different speed, will cause the beam of light to rotate in a circular path of uniform radius. When, however, the beam of light is passed through both prisms and one rotates faster than the other in the same direction, the beam of light follows a spiral path. Assume that the prisms are in such relation that at a given instance the beam of light is near the center of the subject, as shown in Fig. 11. As rotation proceeds, the radius of the path described by the beam continually increases until the beam reaches the outer portion of the subject, at which time the prisms will have acquired such a relative angular position that continued rotation causes the beam of light to commence to describe a path of gradually decreasing radius, whereupon the surface will be scanned as shown in Fig. 12. This operation continues, the beam scanning the surface first from the center to the outer edges and then from the outer edges back to the center.

Obviously, the number of involutions and evolutions in the pattern may be regulated by varying the relative speeds of the light controlling elements. If it is desired to minutely scan the surface, the speeds should be only slightly different. If a rougher scanning, however, is sufficient, then a considerable variation in speeds is permissible.

A description will now be given of the driving mechanism shown in Fig. 9 for rotating the prism or mirror elements. In Fig. 9 a driving motor M, the speed of which may be governed and synchronized in any way or fashion with the speed of the motor at the other end of the system, drives a shaft 37. Splined upon the shaft 37 for axial relation is a gear element 39 arranged to be moved back and forth by the lever 66. Also loosely mounted upon the shaft 37 are two bevel gears 38 and 40, both of which mesh with a bevel gear 42 securely fixed on the shaft 43. By throwing the driving gear 39 into engagement with the gear teeth on the bevel gear 38, the shaft 43 may be driven in one direction; whereas if the element 39 is meshed with the teeth on the other gear 40, then the shaft 43 is driven in the opposite direction.

Similarly, the opposite end of the shaft 37 is provided with a clutch element 56 arranged to be moved in and out of engagement with the bevel gear 58 by means of a lever 57. The gear 58 is loosely mounted upon the shaft 37 and meshes with a bevel gear 55 securely attached to the shaft 54. By throwing the clutch 56 in and out, the shaft 54 may be driven by or may be connected to or disconnected from the driving shaft 37.

The prism elements 11 and 12 are mounted for rotation respectively in the holders 35 and 36. These holders have a set of gear teeth 47 and 48, respectively, about their peripheries. The holders 35 and 36 are loosely and rotatably supported in the guiding supports 45 and 46. The gear teeth 48 on the holder 36 mesh with the teeth of a gear 44 secured to shaft 43. Likewise, the teeth 47 on the holder 45 mesh with the gear 49 secured to the shaft 67.

The shaft 54 has a bevel gear 53 secured thereto which meshes with an idler 52, which in turn meshes with a bevel gear 51 secured to the shaft 67. The idler 52 is mounted on a bracket 68 which is secured to a worm gear 50 loosely mounted upon the shaft 67. The worm gear 50 engages a driving pinion 60 mounted on the shaft 59 of a control motor 61.

The control motor 61 is provided with a reversing control switch 62 operated by a lever 64, which also may be employed to adjust the value of the resistance 65 included in the field winding 63 of the motor 61.

Assume that the motor M is rotating in the direction shown by the arrow and that the clutches 39 and 56 are in positions shown. The shafts 43 and 54 are therefore rotated in the directions illustrated by the arrows. If the motor 61 is at rest, power from the shaft 54 is communicated from the idler 52 to the shaft 67, which is caused to rotate in a direction illustrated by the arrows. Under these conditions, the prism elements 11 and 12 are driven in opposite directions, and by selecting the proper ratios for the gears the speeds of these prisms may be the same.

By throwing the clutch 39 into its opposite position, it will be found that the prisms 11 and 12 are driven at equal speeds in the same direction.

If it is desired to vary the ratio of the speed of one element to the speed of the other prism element, the motor 61 is started in operation by throwing the switch 62 to a given position and by applying power to the armature of the motor in any well known manner, such as by the closure of a control switch 69. By causing the motor 61 to rotate in a given direction, the idler 52 is revolved with the rotation of the gear 50, thereby introducing a ratio between the gears 53 and 51 such that the shaft 67 is driven at a speed lower than the speed of shaft 54. The value of this ratio may be determined by controlling the speed of the motor 61. Conversely, if it is desired to drive the shaft 67 at a speed higher than that of shaft 54, the ratio may be reciprocated by driving the motor 61 in the opposite direction.

While the invention has been described in connection with picture transmission apparatus it is understood that it is capable of use wherever it is desired to scan an area or move a beam of light over a surface. Other forms or combinations of variable angle elements may be employed than those specifically described without departing from the spirit of the invention. Either prisms or mirrors or both may be employed in the combination to good advantage. The invention may be employed either with or without other optical elements at either the sending or receiving station in picture transmission systems or in any other place where scanning mechanism is of use.

What is claimed is:

1. In a system for the electrical transmission of images, scanning apparatus comprising a variable angle device for controlling the direction of a beam of light and comprising a plurality of elements each having equal and fixed angles and means for rotating said elements about a common axis to vary their angular relation with respect to each other whereby the beam of light is caused to traverse a definite surface.

2. Scanning apparatus for the transmission of images electrically, comprising variable angle prisms each consisting of a pair of elements and means for rotating the elements of each prism about a common axis and in such relation to each other that the path of a beam of light traversing the prisms will have a trace over the whole surface of the image.

3. Scanning apparatus for the transmission of images electrically, comprising a pair of variable angle prisms each consisting of a pair of elements and means for rotating the elements about a common axis and in such relation to each other that a light beam will be caused to traverse an image rapidly in one direction and less rapidly in another direction.

4. Scanning apparatus for the transmission of images electrically, comprising a pair of variable angle prisms each consisting of a pair of elements mounted to rotate about a common axis and means for varying the angles formed by the surfaces of the elements of each prism to cause a beam of light to traverse an image rapidly in one direction and less rapidly in another direction.

5. In a system for the transmission of images electrically, a sending station and a receiving station, and a pair of variable angle prisms at each station, each of said prisms comprising a pair of elements mounted to rotate on a common axis, and means for rotating the elements of each pair of prisms at each station in synchronism with the elements of the corresponding prism at the other station to similarly vary the paths of light beams traversing the prisms at each station.

6. In a picture transmission system, the combination with a surface to be scanned, a source of light and means for directing the movement of a beam of light over the surface to be scanned comprising a plurality of light controlling elements mounted for high speed rotation about a common axis and motor operated means for rotating said elements to cause a variation in the angle caused by their surfaces.

7. In a picture transmission system, in combination, a source of light, a photoelectric cell sensitive to a beam of light from said source, an object to be scanned, a plurality of light controlling elements mounted for high speed rotation about a common axis, and means for driving said elements at such speed and in such relation to each other that the angle formed by their surfaces will cause the beam of light to traverse the surface of the object to be scanned rapidly in one direction and less rapidly in another direction.

In witness whereof, I hereunto subscribe my name this 19th day of August A. D., 1925.

HERBERT E. IVES.